Patented Feb. 6, 1940

2,188,903

UNITED STATES PATENT OFFICE 2,188,903

POLYSTYRENE COMPOSITIONS

Toivo A. Kauppi, Kenneth D. Bacon, and Frank B. Smith, Midland, Mich., assignors to The Dow Chemical Company, Midland, Mich., a corporation of Michigan No Drawing. Application December 3, 1938, Serial No. 243,770

12 Claims. (Cl. 260—36)

This invention concerns new plastic compositions comprising polystyrene plasticized with certain hydro-aromatic-substituted diaryl ethers.

Polystyrene is known to possess a number of properties, such as transparency, impermeability to moisture, excellent dielectric characteristics, resistance to attack by alcohols, acids and alkalies, etc., which render it valuable as a plastic material for the manufacture of molded articles, films, varnishes, etc. However, polystyrene also has certain limitations which restrict its field of use and which may even prohibit certain particular uses. For example, thin films of polystyrene will withstand only moderate flexing or stretching when first formed and tend to become even more brittle upon ageing. In this connection, it may be mentioned that the flexibility of a polystyrene film and the elongation which it will withstand without breaking vary proportionately with one another, i. e. the elongation which the film will withstand is a measure of its flexibility. A film of pure polystyrene, 1.25 cm. wide by 0.04 cm. thick, has a stretch of only 1 per cent of its original length as determined with the Scott tensile testing machine. Such a low degree of extensibility renders polystyrene unsuitable for the manufacture of flexible films and foils or for the preparation of coating compositions for articles which become flexed or wrinkled in use. Furthermore, it renders the injection molding of thin-walled hollow articles a difficult operation since such articles should possess a certain amount of flexibility in order to be easily ejected from the molding die. A further limitation of polystyrene is its poor adherence to metals, wood, textiles, and the like, which limitation greatly restricts its use in the manufacture of lacquers, insulating varnishes, and other coating compositions.

It has been proposed to improve the flexibility and adherence of polystyrene compositions by incorporating therein certain high-boiling compounds of low volatility, generally known as plasticizing agents. Among the materials which have been proposed as plasticizing agents for polystyrene are tricresyl phosphate, dibutyl phthalate, butyl stearate, glyceryl dibenzyl ether, etc.

The usual effect of plasticizing agents on plastic materials is to increase the flexibility, extensibility, and ability to be molded while at the same time lowering the yield point, tensile strength, and hardness. Ordinarily, the plasticizing effect is directly proportional to the concentration of the plasticizing agent, i. e. an increase in the concentration of the plasticizing agent produces a corresponding increase in the flexibility, extensibility, etc., and a corresponding decrease in the tensile strength, hardness, etc. of the plasticized composition.

In the case of polystyrene, however, the behavior of a plasticizing agent is somewhat different. As the proportion of plasticizing agent to polystyrene is increased, the tensile strength decreases, but the flexibility and per cent elongation remain relatively constant until a certain "threshold concentration" of plasticizing agent is reached, at which point a small increase in the concentration of plasticizing agent produces a large increase in elongation with a relatively small decrease in tensile strength.

Accordingly, the most desirable plasticizing agent for polystyrene is one which has a low "threshold concentration", i. e. one which, at relatively low concentrations, produces a large increase in extensibility with a relatively small decrease in tensile strength and hardness. Other desirable properties of a plasticizing agent for polystyrene are: low volatility, so that it does not evaporate from the plasticizing composition on ageing or at molding temperatures; resistance to attack by water, alcohols, acids, and alkalies; resistance to discoloration upon exposure to sunlight; good dielectric characteristics; and, compositions containing the plasticizing agent should retain their flexibility at low temperatures. In many instances, lack of toxicity, solubility in the common solvents for polystyrene, and freedom from taste or odor are also important attributes of a plasticizing agent for polystyrene. Some of these properties are enjoyed by many of the known plasticizing agents for polystyrene but few, if any, of such agents contribute all of the desired properties to a polystyrene composition.

An object of the present invention is to provide a plastic composition comprising polystyrene and a non-volatile plasticizing agent which, at relatively low concentrations, increases the flexibility and toughness of the polystyrene without unduly softening or weakening the same. Another object is to provide new plastic compositions, comprising polystyrene and such agents, which are clear and transparent and which do not discolor appreciably upon exposure to sunlight. A still further object is to provide such compositions having good electrical insulation properties and being resistant to attack by water, alkalies, and acids. Other objects will be apparent from the following description of the invention.

According to the present invention, the foregoing and related ends may be attained in compositions comprising polystyrene plasticized with one or a combination of hydro-aromatic-substituted aryl ethers having the general formula:

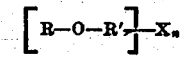

wherein R and R' each represents an aryl group selected from the class consisting of the phenyl, alkyl-phenyl, aralkyl-phenyl, and naphthyl radicals, and their halogen substitution products; X is a hydro-aromatic radical selected from the class consisting of the cyclohexyl and hydrocarbon substituted cyclohexyl radicals, e. g. alkyl-cyclohexyl, dicyclohexyl, and aryl-cyclohexyl radicals; and $n$ is an integer from 1 to 6, inclusive. Many of such compounds are described in a co-pending application of one of the present inventors, Serial No. 192,857, filed February 26, 1938. In general, these compounds are prepared by condensing a cyclohexylating agent, or a substituted cyclohexylating agent, such as cyclohexene, 3-methyl-cyclohexyl chloride, 4-phenyl-cyclohexanol, 3-cyclohexyl-cyclohexyl bromide, etc., with a diaryl ether, such as diphenyl ether, chloro-diphenyl ether, naphthyl phenyl ether, tolyl phenyl ether, etc., in the presence of a Friedel-Crafts or other alkylation catalyst. These compounds vary in physical characteristics from viscous liquids to hard brittle resinous solids, depending upon the number of hydro-aromatic radicals substituted in the diaryl ether. They are characterized by inertness to attack by most common chemicals with which plastic compositions may be brought in contact, and are resistant to discoloration by light. They possess excellent dielectric properties, are substantially non-volatile, and possess the same general solubility characteristics as polystyrene, i. e. solubility in aromatic hydrocarbons, esters, ketones, chlorinated aliphatic hydrocarbons, etc., and insolubility in alcohols, aliphatic hydrocarbons, etc. The following Table I sets forth a few of the physical properties of a number of the hydro-aromatic-substituted aryl ethers which may be employed as plasticizing agents for polystyrene. In said table, the term "degree of substitution" refers to the approximate number of hydro-aromatic radicals substituted in the aryl ether nucleus.

30-50 per cent by weight of the plasticized composition, although some of the resin-like hydro-aromatic-substituted aryl ethers have somewhat higher threshold concentrations. These latter products act as resin-type plasticizing agents and are very useful when employed in combination with other plasticizing agents of the present class to prepare polystyrene compositions having good flexibility and high surface hardness. For example, a mixture of a resinous cyclohexylated diphenyl ether, e. g. plasticizer number 6 in the above table, and a liquid cyclohexylated diphenyl ether, e. g. plasticizer number 4, may be incorporated with polystyrene to prepare a flexible composition which has a much higher surface hardness than a similar composition containing only the liquid plasticizing agent.

The proportion of plasticizing agent to be employed in the new polystyrene compositions also depends upon the hardness, toughness, strength, and flexibility desired in the plasticized composition, which in turn depend upon the use to which the composition is to be put. For example, compositions for use in injection molding must flow well at molding temperatures but should harden rapidly at lower temperatures. They should be hard enough when cold to withstand scratching, and tough enough to withstand shock. Compositions for use in making thin films or foils should have high flexibility at all temperatures met with in service and be sufficiently hard and tough to withstand abrasion. Similarly, lacquer coatings must be hard, tough, and possess good adherence and flexibility. The exact proportion of plasticizing agent to be employed in preparing compositions having such properties depends upon the particular plasticizing agent employed as well as upon the presence of any addition agents, e. g. fillers, gums, resins, etc., but is usually between about 30 and

Table I

| | Plasticizer name | Degree of substitution | Appearance | Boiling range, °C. | Density | Viscosity, cps. at 60° C. | Refractive index at 60° C. |
|---|---|---|---|---|---|---|---|
| 1 | Cyclohexyl diphenyl ether | 1 | Water-white mobile liquid. | 205-230 at 20 mm | 1.0387 at 60/60° C | 8.2 | 1.5693. |
| 2 | ----do---- | 1.4 | ----do---- | 231-273 at 20 mm | 1.0346 at 60/60° C | 24.9 | 1.5679. |
| 3 | ----do---- | 1.8 | Water-white viscous liquid. | 273-300 at 20 mm | 1.0307 at 60/60° C | 207.5 | 1.5662. |
| 4 | ----do---- | 2.75 | ----do---- | 300 at 20 mm. to 296 at 5 mm. | 1.0285 at 60/60° C | 1138.0 | 1.5523. |
| 5 | ----do---- | 4 | Pale straw-colored tacky resin. | 295-330 at 5 mm | 1.0277 at 98.9° C | 344.0 at 98.9° C | 1.5530. |
| 6 | ----do---- | 6 | Yellow resin M. P. 35° C | 295-310 at 1 mm | | | |
| 7 | ----do---- | 6 | Brown resin M. P. 50° C | 310-340 at 1 mm | | | |
| 8 | Cyclohexyl phenyl diphenyl ether. | 1.5 | Pale yellow liquid with blue fluorescence. | 252-280 at 20 mm | 1.0813 at 25/25° C | | 1.6054 at 25° C. |
| 9 | ----do---- | 3 | Light brown tacky resin | 230-300 at 5 mm | 1.0562 at 80/80° C | | 1.5809. |
| 10 | Cyclohexyl chloro-diphenyl ether. | 1.7 | Light yellow resin liquid | 195-210 at 5 mm | | | |
| 11 | Cyclohexyl mono-para-tertiary-butyl diphenyl ether. | 2+ | Light yellow tacky resin | >180 at 2.5 mm | 1.015 at 100/100° C | 1878 | 1.5485. |
| 12 | Cyclohexyl alpha-naphthyl phenyl ether. | Mixed | Light yellow viscous liquid. | >210 at 20 mm | 1.071 at 100/100° C | 2040 | 1.5968. |
| 13 | 1-phenyl-cyclohexyl diphenyl ether. | 2+ | Red-brown tacky resin | >200 at 20 mm | 1.055 at 100/100° C | 3800 | 1.6039. |
| 14 | 3-cyclohexyl-cyclohexyl diphenyl ether. | 2+ | Red-brown viscous liquid | >200 at 20 mm | 0.996 at 100/100° C | 401 | 1.5583. |
| 15 | 3-methyl-cyclohexyl diphenyl ether. | 2+ | Dark brown viscous liquid | >160 at 20 mm | 1.062 at 100/100° C | 539 | 1.5480. |

The new plasticizing agents may be employed in any proportion within the limits of their compatibility with polystyrene, although it is preferable to employ them in proportions approximately equal to their threshold concentrations in order to secure maximum flexibility with minimum loss of hardness and strength. Most of the plasticizing agents of the present class have threshold concentrations in the neighborhood of about 50 per cent of the combined weight of the polystyrene and the plasticizing agent.

The new plasticizing agents may be incorporated with polystyrene in any of the usual ways, e. g. by mixing the polystyrene and plasticizing agent and kneading or rolling the mixture until a homogeneous composition is obtained; by dissolving the polystyrene and plasticizing agent in a mutual solvent, such as benzene, toluene, etc., and thereafter removing the solvent; by polymerizing a mixture of monomeric styrene and the plasticizing agent; etc. Compositions suitable for use in the manufacture of molded articles are preferably, although not necessarily, prepared by mixing pulverized or granular polystyrene with one of the plasticizing agents of the present class on hot compounding rolls at a temperature of about 80°–120° C.

Film-casting compositions comprising polystyrene and one of the new plasticizing agents are preferably prepared by dissolving polystyrene in from about 5 to 10 parts by weight of a solvent, such as ethylbenzene, xylene, etc., or a solvent mixture, such as xylene-dioxane (97:3), toluene-methyl isobutyl ketone, etc., and the plasticizing agent is added in the proportion necessary to give the desired degree of flexibility, usually in a proportion representing from 30 to 50 per cent by weight of the polystyrene. The resultant solution, which is preferably quite viscous, may then be spread or flowed onto a film-casting surface of glass or polished metal, and, after evaporation of the solvent, the film is stripped or peeled from the surface. Other methods of casting films or foils from such compositions will be apparent to those skilled in the art.

Lacquers, varnishes, and other coating compositions suitable for application on wood, metal, cloth, etc., are usually prepared by dissolving the polystyrene and plasticizing agent, together with any desired addition agents, such as resins, pigments, dyes, gums, etc., in a suitable thinner. Ordinarily, it is preferable to employ approximately 30 parts by weight of total solids per 100 parts of thinner, although these proportions may be varied considerably depending upon the viscosity desired. Any volatile organic solvent in which both the polystyrene and plasticizing agent are soluble, e. g. benzene, toluene, xylene, dioxane, etc., or mixtures thereof, may be employed as thinner. Ordinarily, a mixture of solvents of different boiling points is preferred. The liquid coating compositions so prepared may be applied in any of the usual ways, e. g. by dipping, brushing, etc. The protective coatings thus applied have good adherence on metal, wood, etc., are resistant to attack by moisture, alkalies, and acids, and do not discolor appreciably upon standing.

The following examples illustrate various ways in which the principle of the invention has been applied, but are not to be construed as limiting the same:

EXAMPLE 1

Films of polystyrene plasticized with the plasticizing agents of the present class were prepared in the following manner: A mixture of polystyrene and the desired amount of the plasticizing agent was dissolved in approximately 5 parts by weight of toluene, and the resultant solution was drawn into films in accordance with the procedure described in Ind. & Eng. Chem., 29, 681 (1937). The films so prepared were heated for 16 hours at 70° C. and were then tested for tensile strength and elongation on a Scott tensile testing machine. The following Table II presents the test data obtained, together with comparative data on a film of unplasticized polystyrene and on films of polystyrene plasticized with the previously known plasticizing agent, triphenyl phosphate. In said Table II, the plasticizing agent number, given in column 3, is the number which was assigned to that particular agent in Table I. The amount of plasticizing agent is expressed in per cent of the combined weight of the polystyrene and plasticizing agent, the tensile strength is the tension in kilograms per square centimeter of the original cross-section of the film sustained at the point of rupture, and the elongation is the per cent of the original length of the film by which it may be elongated under tension before breakage occurs.

Table II

| Experiment No. | Plasticizing agent | | | Tensile strength kg./cm.$^2$ | Elongation, percent | Approximate "Threshold Concentration" |
|---|---|---|---|---|---|---|
| | Name | Number | Percent | | | |
| 1 | None | | | 270 | 1 | |
| 2 | Cyclohexylated diphenyl ether | 3 | 44 | 120 | 15 | |
| 3 | do | 3 | 46 | 67 | 30 | 46 |
| 4 | do | 3 | 48 | 66 | 80 | |
| 5 | Cyclohexylated phenyl diphenyl ether | 8 | 35 | 200 | 6 | |
| 6 | do | 8 | 37.5 | 145 | 25 | 37–38 |
| 7 | do | 8 | 43 | 75 | 70 | |
| 8 | Cyclohexylated chloro-diphenyl ether | 10 | 33 | 140 | 3 | |
| 9 | do | 10 | 35 | 43 | >160 | 34–35 |
| 10 | Triphenyl phosphate | | 29 | 120 | 2 | |
| 11 | do | | 31 | 94 | 19 | 30 |
| 12 | do | | 33 | 48 | 70 | |

It will be noted from the above table that although the "threshold concentration" of triphenyl phosphate is somewhat lower than those of the new plasticizing agents, triphenyl phosphate produces a much greater decrease in tensile strength per unit increase in elongation than do the new plasticizing agents.

EXAMPLE 2

A brushing lacquer was prepared having the following composition:

| | Parts by weight |
|---|---|
| Polystyrene | 70 |
| Bakelite resin No. 254 | 10 |
| Cyclohexylated diphenyl ether (plasticizer No. 3 in Table I) | 20 |
| Solvent (equal parts by volume of toluene and methyl isobutyl ketone) | 320 |

When brushed on a thin metal strip, this lacquer dried to form a hard glossy coat which did not crack or break away from the strip when the latter was bent. A similar composition containing dibutyl phthalate as the plasticizing agent was not nearly so flexible or adherent when applied to a metal strip and could not withstand bending without cracking and breaking away from the surface of the strip. The electrical properties of the lacquer film described above are presented in Table III below, together with similar data for an unplasticized polystyrene lacquer film and for a lacquer film plasticized with cyclohexylated diphenyl ether but containing no resin constituent.

Table III

| Composition of film | At 1,000 cycles | | | At 1,000,000 cycles | | | Volume resistance, ohm cms. | Average dielectric strength, volts/mil |
|---|---|---|---|---|---|---|---|---|
| | Power factor | Q* | Dielectric constant | Power factor | Q* | Dielectric constant | | |
| Pure polystyrene | 0.251 | 3.98 | 2.65 | 0.279 | 3.59 | 2.48 | $>7\times10^{14}$ | 1278 |
| 70% polystyrene<br>20% plasticizer No. 3<br>10% Bakelite resin No. 254 | 0.91 | 1.10 | 2.76 | 0.431 | 2.32 | 2.51 | $>7\times10^{14}$ | 605 |
| 72% polystyrene<br>28% plasticizer No. 3 | 0.30 | 3.33 | 2.55 | 0.185 | 5.39 | 2.45 | $>7\times10^{14}$ | 1464 |

*The "Q" factor is the reciprocal of the power factor, useful for comparison of data in high frequency tests.

EXAMPLE 3

A lacquer having the following composition:

| | Parts by weight |
|---|---|
| Polystyrene | 60 |
| Cyclohexyl-chloro-diphenyl ether (plasticizer No. 10) | 27 |
| Cyclohexyl-diphenyl ether resin (plasticizer No. 7) | 13 |
| Solvent (equal parts by volume of toluene and methyl isobutyl ketone) | 230 | was found suitable for application on wood, metal, etc. to give a hard, tack-free film which had excellent flexibility and adherence.

While the foregoing description has been limited to plastic compositions comprising pure polystyrene, the invention is applicable to vinyl aromatic compounds in general as well as to the mixed polymerization products of styrene, such as are obtained by the conjoint polymerization of styrene and other unsaturated compounds, e. g. divinyl benzene, diallyl maleate, ethyl acrylate, allyl cinnamate, vinyl chloride, maleic anhydride, diallyl oxalate, etc. For example, polymerized p-chlorstyrene, or the insoluble polymer obtained by the polymerization of a mixture of styrene and the di-cinnamate of 1.4-dioxanediol-2.3, described in the co-pending application of E. C. Britton et al., Serial No. 191,958, filed February 23, 1938, may be plasticized with one or more of the new plasticizing agents, e. g. plasticizer number 4 in Table I, to obtain plastic compositions having greatly improved molding properties as a result of the increased flexibility and flow characteristics brought about by the presence of the plasticizing agent. In the following claims, the expression "a solid resinous derivative of styrene" is employed generically as including polymerized vinyl aromatic compounds, e. g. p-chlorstyrene, p-ethylstyrene, 2.4-dimethylstyrene, as well as polystyrene itself and the resinous co-polymers of styrene and other unsaturated organic compounds. Similarly, the expression "a hydro-aryl radical of the hydro-benzene series wherein the hydro-benzene nucleus contains no olefinic linkages" is employed generically as including the cyclohexyl and hydrocarbon-substituted cyclohexyl radicals.

Other modes of applying the principle of our invention may be employed instead of those explained, change being made as regards the composition herein disclosed, provided the ingredients stated by any of the following claims or the equivalent of such stated ingredients be employed.

We therefore particularly point out and distinctly claim as our invention:

1. A composition of matter comprising a solid resinous derivative of styrene and, as a plasticizing agent therefor, a compound having the general formula

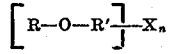

wherein R and R' each represents an aryl group selected from the class consisting of the phenyl, alkyl-phenyl, aralkyl-phenyl, diphenyl, and naphthyl radicals, and their halogen substitution products, X represents a hydro-aryl radical of the hydro-benzene series wherein the hydro-benzene nucleus contains no olefinic linkages, and n represents an integer from 1 to 6, inclusive.

2. A composition of matter comprising a solid resinous derivative of styrene and, as a plasticizing agent therefor, a compound having the general formula

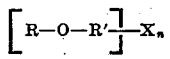

wherein R and R' each represents an aryl group selected from the class consisting of the phenyl, alkyl-phenyl, aralkyl-phenyl, diphenyl, and naphthyl radicals, and their halogen substitution products, X represents a hydro-aromatic radical selected from the class consisting of the cyclohexyl, dicyclohexyl, alkyl-cyclohexyl, and aryl-cyclohexyl radicals, and n represents an integer from 1 to 6, inclusive.

3. A composition of matter comprising a solid resinous derivative of styrene and, as a plasticizing agent therefor, a compound having the general formula

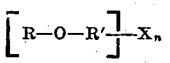

wherein R and R' each represents an aryl group selected from the class consisting of the phenyl, alkyl-phenyl, aralkyl-phenyl, diphenyl, and naphthyl radicals, and their halogen substitution products, X represents a hydro-aromatic radical selected from the class consisting of the cyclohexyl, dicyclohexyl, alkyl-cyclohexyl, and aryl-cyclohexyl radicals, and n represents an integer from 1 to 6, inclusive, said plasticizing agent being present in an amount sufficient to increase the flexibility of said composition substantially beyond the inherent flexibility of the unplasticized styrene polymer.

4. A composition of matter comprising a solid resinous derivative of styrene and, as a plasticizing agent therefor, at least one cyclohexylated diphenyl ether wherein the number of cyclohexyl groups is from 1 to 6, inclusive.

5. A composition of matter comprising polystyrene, and as a plasticizing agent therefor, a compound having the general formula

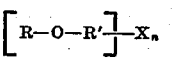

wherein R and R' each represents an aryl group selected from the class consisting of the phenyl, alkyl-phenyl, aralkyl-phenyl, diphenyl, and naphthyl radicals, and their halogen substitution products, X represents a hydro-aryl radical of the hydro-benzene series wherein the hydro-benzene nucleus contains no olefinic linkages, and $n$ represents an integer from 1 to 6, inclusive.

6. A composition of matter comprising polystyrene, and as a plasticizing agent therefor, a compound having the general formula $$[R\!-\!O\!-\!R']_n\!-\!X_n$$

wherein R and R' each represents an aryl group selected from the class consisting of the phenyl, alkyl-phenyl, aralkyl-phenyl, diphenyl, and naphthyl radicals, and their halogen substitution products, X represents a hydro-aromatic radical selected from the class consisting of the cyclohexyl, dicyclohexyl, alkyl-cyclohexyl, and aryl-cyclohexyl radicals, and $n$ represents an integer from 1 to 6, inclusive.

7. A composition of matter comprising polystyrene and, as a plasticizing agent therefor, a compound having the general formula $$[R\!-\!O\!-\!R']_n\!-\!X_n$$

wherein R and R' each represents an aryl group selected from the class consisting of the phenyl, alkyl-phenyl, aralkyl-phenyl, diphenyl, and naphthyl radicals, and their halogen substitution products, X represents a hydro-aromatic radical selected from the class consisting of the cyclohexyl, dicyclohexyl, alkyl-cyclohexyl, and aryl-cyclohexyl radicals, and $n$ represents an integer from 1 to 6, inclusive, said plasticizing agent being present in an amount equal to between about 30 and about 50 per cent of the combined weight of the polystyrene and plasticizing agent.

8. A composition of matter comprising polystyrene and, as a plasticizing agent therefor, at least one cyclohexylated diphenyl ether wherein the number of cyclohexyl groups is from 1 to 6, inclusive.

9. A composition of matter comprising polystyrene and, as a plasticizing agent therefor, at least one cyclohexylated phenyl diphenyl ether wherein the number of cyclohexyl groups is from 1 to 6, inclusive.

10. A composition of matter comprising polystyrene and, as a plasticizing agent therefor, at least one cyclohexylated chloro-diphenyl ether wherein the number of cyclohexyl groups is from 1 to 6, inclusive.

11. A transparent flexible sheet comprising polystyrene and, as a plasticizing agent therefor, a compound having the general formula $$[R\!-\!O\!-\!R']_n\!-\!X_n$$

wherein R and R' each represents an aryl group selected from the class consisting of the phenyl, alkyl-phenyl, aralkyl-phenyl, diphenyl, and naphthyl radicals, and their halogen substitution products, X represents a hydro-aromatic radical selected from the class consisting of the cyclohexyl, dicyclohexyl, alkyl-cyclohexyl, and aryl-cyclohexyl radicals, and $n$ represents an integer from 1 to 6, inclusive, said plasticizing agent being present in an amount sufficient to increase the flexibility of said sheet substantially beyond the inherent flexibility of an unplasticized sheet of polystyrene.

12. A liquid coating composition comprising polystyrene, at least one compound having the general formula $$[R\!-\!O\!-\!R']_n\!-\!X_n$$

wherein R and R' each represents an aryl group selected from the class consisting of the phenyl, alkyl-phenyl, aralkyl-phenyl, diphenyl, and naphthyl radicals, and their halogen substitution products, X represents a hydro-aromatic radical selected from the class consisting of the cyclohexyl, dicyclohexyl, alkyl-cyclohexyl, and aryl-cyclohexyl radicals, and $n$ represents an integer from 1 to 6, inclusive, and at least one volatile solvent.

TOIVO A. KAUPPI.
KENNETH D. BACON.
FRANK B. SMITH.